UNITED STATES PATENT OFFICE.

CHRISTOPHER RIS, OF BASLE, SWITZERLAND, ASSIGNOR TO ANILINE COLOR AND EXTRACT WORKS, FORMERLY JOHN R. GEIGY, OF BASLE, SWITZERLAND.

GREEN SULFUR DYE AND PROCESS OF MAKING SAME.

SPECIFICATION forming part of Letters Patent No. 698,555, dated April 29, 1902.

Application filed February 5, 1902. Serial No. 92,718. (Specimens.)

*To all whom it may concern:*

Be it known that I, CHRISTOPHER RIS, a citizen of the Swiss Confederation, residing at Basle, Switzerland, have invented a new and useful Green Sulfur Dye and Process of Making Same, of which the following is a specification.

In my application for United States Letters Patent Serial No. 73,540, filed August 28, 1901, for process for producing blue sulfur dye is described a process of making a blue sulfur dyestuff by starting from a new sulfo-acid of dimethyl-paraämido-paraoxydiphenylamin. The latter is obtained by reacting upon dimethyl-paraämido-phenylquinoneimid—viz., indophenol from dimethyl-paraphenylenediamin and phenol—with solutions of normal sulfits.

I have now discovered that a new green sulfur dyestuff of a relatively pure shade and of great fastness to light and to soap can be obtained when the above-named sulfo-acid is melted in presence of copper compounds, such as salts of copper or finely-divided metallic copper, with polysulfids of alkali, such as sodium sulfid and sulfur.

First example: One hundred parts of crystallized sodium sulfid and forty parts of sulfur are melted together till a solution is obtained. Then a solution of forty parts of dimethylparaämido-paraoxydiphenylaminsulfo-acid with eight parts of carbonate of sodium in about sixty parts of water, and a concentrated solution of eight parts of sulfate of copper in hot water are added. Then the mass is heated at a temperature of 125° to 130° centigrade till an augmentation of the coloring-matter can no more be observed. The process may be carried out in an iron vessel furnished with a reflux apparatus. The operation finished, the mass is brought to dryness, then pulverized, or it may be dissolved in about one thousand parts of hot water, precipitated by a current of air, then filtered off, pressed, and dried.

Second example: The same relative quantities of sodium sulfid, sulfur, dimethyl-paraamido-paraoxydiphenylaminsulfo-acid and sodium carbonate are dissolved and mixed together, as above described, then a paste containing four parts of finely-divided metallic copper is added and further proceeded, as described in the foregoing example.

Instead of sulfate of copper there may be used other salts of copper—for instance, carbonate, nitrate, chlorid of copper, sulfid, oxid, or hydroxid of copper.

The new dyestuff forms a dark powder soluble in water with a dark-violet color. The solubility is increased by addition of sodium sulfid or of caustic-soda lye. In alcohol the color is but scarcely soluble, insoluble in ether and benzene. By addition of acids to the watery solution a light brown precipitate is formed, which is insoluble in ammonia and in sodium carbonate, soluble in hot diluted caustic-soda lye, and in sodium sulfid with dark-violet color, soluble in concentrated sulfuric acid with blackish-brown color, which turns slowly to a greyish-violet shade. The coloring-matter dyes unmordanted cotton in a bath containing sodium sulfid and salt relatively pure green shades of a yellowish hue of great fastness to light and to soap.

I claim—

1. The production of a new green sulfur dyestuff by melting the sulfo-acid of dimethyl-para-amido-paraoxydiphenylamin, obtainable from dimethyl-paraämidophenylquinoneimid and normal sulfits, with polysulfids of alkali in presence of copper compounds substantially as described.

2. As a new article of manufacture the green sulfur dyestuff derived from the said sulfo-acid of dimethyl-paraämido-paraoxydiphenylamin, which forms a dark powder, soluble in water with a dark-violet color, scarcely soluble in alcohol, insoluble in ether and benzene, the watery solution being precipitated by addition of acids in light brown flocks, which are insoluble in ammonia and in sodium-carbonate solutions, soluble in concentrated sulfuric acid with blackish-brown color, turning slowly to a greyish-violet shade—the coloring-matter dyeing unmordanted cotton fast green shades, substantially as described.

In testimony whereof I have signed my name to this specification in the presence of two subscribing witnesses.

CHRISTOPHER RIS.

Witnesses:
GEORGE GIFFORD,
ALBERT GUAETER, Jun.